United States Patent [19]

Le Bars et al.

[11] Patent Number: 5,082,201
[45] Date of Patent: Jan. 21, 1992

[54] MISSILE HOMING DEVICE

[75] Inventors: Jean-Francois Le Bars, Paris; Vincent Vilbois, Montigny le Bretonneux; Oliver Dez, Issy les Moulineaux, all of France

[73] Assignee: Thomson CSF, Paris, France

[21] Appl. No.: 522,040

[22] Filed: May 11, 1990

[30] Foreign Application Priority Data

May 23, 1989 [FR] France ................ 89 06718

[51] Int. Cl.$^5$ .................... F41G 7/26; F42B 15/01
[52] U.S. Cl. .................... 244/3.16; 244/3.13
[58] Field of Search .............. 244/3.11, 3.13, 3.15, 244/3.16

[56] References Cited

U.S. PATENT DOCUMENTS

| | | | |
|---|---|---|---|
| 3,912,859 | 10/1975 | Christopherson | 244/3.16 X |
| 4,193,688 | 3/1980 | Watkins | 244/3.16 |
| 4,227,077 | 10/1980 | Hopson et al. | 244/3.16 |
| 4,236,177 | 11/1980 | Oshima et al. | 358/55 |
| 4,243,187 | 1/1981 | Esker | 244/3.13 |
| 4,383,663 | 5/1983 | Nichols | 244/3.16 |
| 4,393,408 | 7/1983 | Beck et al. | 358/205 |
| 4,423,437 | 7/1983 | Beck et al. | 358/113 |
| 4,476,494 | 10/1984 | Tugayé | 244/3.17 X |
| 4,520,688 | 12/1984 | Le Bars | 74/572 |
| 4,537,370 | 8/1985 | Pizzurro | 244/3.16 |
| 4,568,040 | 2/1986 | Metz | 244/3.22 |
| 4,611,772 | 9/1986 | Stessen | 244/3.16 |
| 4,615,496 | 10/1986 | Pinson | 244/3.16 |
| 4,676,455 | 6/1987 | Diehl et al. | 244/3.13 |
| 4,699,332 | 10/1987 | Bigot et al. | 244/3.11 |
| 4,710,028 | 12/1987 | Grenier et al. | 356/375 |
| 4,711,413 | 12/1987 | Stessen | 244/3.16 |
| 4,712,270 | 1/1988 | Salkeld | 244/3.11 |
| 4,728,057 | 3/1988 | Dunne | 244/3.16 |
| 4,770,482 | 9/1988 | Sweeney et al. | 244/3.16 X |
| 4,773,754 | 9/1988 | Eisele | 244/3.13 X |
| 4,776,274 | 10/1988 | Kriz et al. | 244/3.16 X |
| 4,901,946 | 2/1990 | Arnaud et al. | 244/3.13 |
| 4,965,453 | 10/1990 | Heschette et al. | 244/3.16 X |

FOREIGN PATENT DOCUMENTS

| | | |
|---|---|---|
| 99769 | 2/1984 | European Pat. Off. . |
| 2312760 | 12/1976 | France . |
| 2071857 | 9/1981 | United Kingdom . |
| 2087185 | 5/1982 | United Kingdom . |
| 2184313 | 6/1987 | United Kingdom . |

Primary Examiner—John B. Sotomayor
Attorney, Agent, or Firm—Cushman, Darby & Cushman

[57] ABSTRACT

The disclosed device can be used to determine coordinates expressing the angular deviation between the direction in which a missile is located and a line of sight in which a target is located. The device comprises means to project and shift an image on a linear senor, in such a way that the field of acquisition of the homing device has a section, by a plane perpendicular to the line of sight, that is ring-shaped having a diameter corresponding to a wide field aperture at the moment when the missile is launched, so that the missile is definitely intercepted in the field of acquisition, and then having a diameter that is variable as a function of time in such a way that the ring follows the missile as and when it approaches the line of sight through the action of a remote control system or a directive beam system. Finally, the section of the field is reduced to a simple disk, corresponding to a field having a very small angular aperture, giving a better range than standard homing devices and giving a low probability of false alarms arising out of the presence of the sun or of decoys. The device can be applied to weapons systems.

4 Claims, 3 Drawing Sheets

MISSILE HOMING DEVICE

BACKGROUND OF THE INVENTION

1. Field of the Invention

The invention concerns a missile homing device. A standard weapons system has a missile launch ramp, a target-tracking device and a missile homing device. The target-tracking device may be of the radar type or of the optronic type but, in all cases, it covers a narrow field.

A missile is fired from a ramp located at a certain distance from the target-tracking device. Moreover, the trajectory of the missile, when it starts off, is a relatively random one, even if the direction of the launch ramp is perfectly parallel to the line of sight of the tracking device towards the target. Consequently, there is little chance that the missile will enter the narrow field covered by the target-tracking device. It is therefore necessary to provide for a so-called missile homing device, having a wide field of acquisition, to localize the missile as soon as it leaves the launch ramp, and to determine coordinates enabling the missile to be brought back to the line of sight of the target-tracking device. The standard way to home the missile is either by remote control or by a directive beam.

2. Description of the Prior Art

Known missile homing devices are of the wide-angle radar type, or of the directive laser beam type or of the pseudo-imaging or infrared imaging type.

Pseudo-imaging or infrared imaging devices localize the missile by the infrared radiation from the jet pipe. They include an optomechanical scanning device and one or more sensors that are photosensitive in the infrared range. For example, the optomechanical device scans the image of an acquisition field having an angular width of 10°, in the form of a square image that is analyzed in 100×100 pixels.

A video signal resulting from this analysis is applied to electronic processing means in order to detect the presence of the missile and to determine its coordinates with respect to a reference point centered on the image. These coordinates express the angular deviation between the direction in which the missile is located and a line of sight common to the homing device and to the target-tracking device. Since these known homing devices analyze the entire acquisition field, which is wide, the scanning should be fast and the pass-band of the electronic processing means should therefore be wide. This diminishes the sensitivity of the device and, hence, reduces the range of the homing device, or else it calls for more complex processing and image-analyzing means to obtain a big range. Furthermore, the missile is always on the border of the field at the start of flight, hence a large part of the field that is far from the part where the missile is located is analyzed unnecessarily. This makes the homing device sensitive to the presence of the sun or of decoys

SUMMARY OF THE INVENTION

The aim of the invention is to propose a homing device, of the imaging or pseudo-imaging type, which is simpler than known devices while, at the same time, having a greater range, and which is less sensitive to the presence of the sun or of decoys. The object of the invention is a homing device which exploits the fact that the missile always enters the acquisition field from the periphery of this field. It is therefore enough to analyze an acquisition field, for example its section, by a plane perpendicular to the line of sight, in the shape of a ring, the central zone being a blind zone, and having a diameter that varies as and when the missile approaches the line of sight. As the diameter is wide at the moment of the departure, the missile is forced to re-enter the field. Then a reduction in the diameter makes it possible to keep the missile in the field while at the same time avoiding, in in many instances, the sun or decoys.

At each instant, the acquisition field covers a solid angle that is smaller than is the case with known devices: this corresponds to a smaller number of analyzed pixels. As a consequence, the pass-band of the electronic processing means may be reduced. The signal-to-noise ratio is therefore better than in the known devices. The range of the device according to the invention is therefore greater, under the same conditions of acquisition of a missile.

According to the invention, there is proposed a missile homing device to determine coordinates expressing the angular deviation between the direction in which a missile is located and a line of sight in which a target is located, comprising: a photosensitive sensor, means to project an image on this sensor and to scan the image with this sensor, means to produce a signal expressing the angular deviation on the basis of signals given by the sensor, wherein the means to project and scan an image cover a field, the section of which, in a plane perpendicular to the line of sight, is a ring having a diameter that is variable as a function of the angular deviation between the direction in which the missile is located and the line of sight.

According to another characteristic of the homing device according to the invention, it includes a device for spectral filtering in the proximity of 4.4 microns enabling, if necessary, the reduction of the sensitivity to the presence of the sun or of decoys when the sun or a decoy is present in the field of acquisition.

BRIEF DESCRIPTION OF THE DRAWINGS

The invention will be understood more clearly and other details will appear from the following description and the accompanying figures, of which.

DESCRIPTION OF THE PREFERRED EMBODIMENTS

Figure 1:
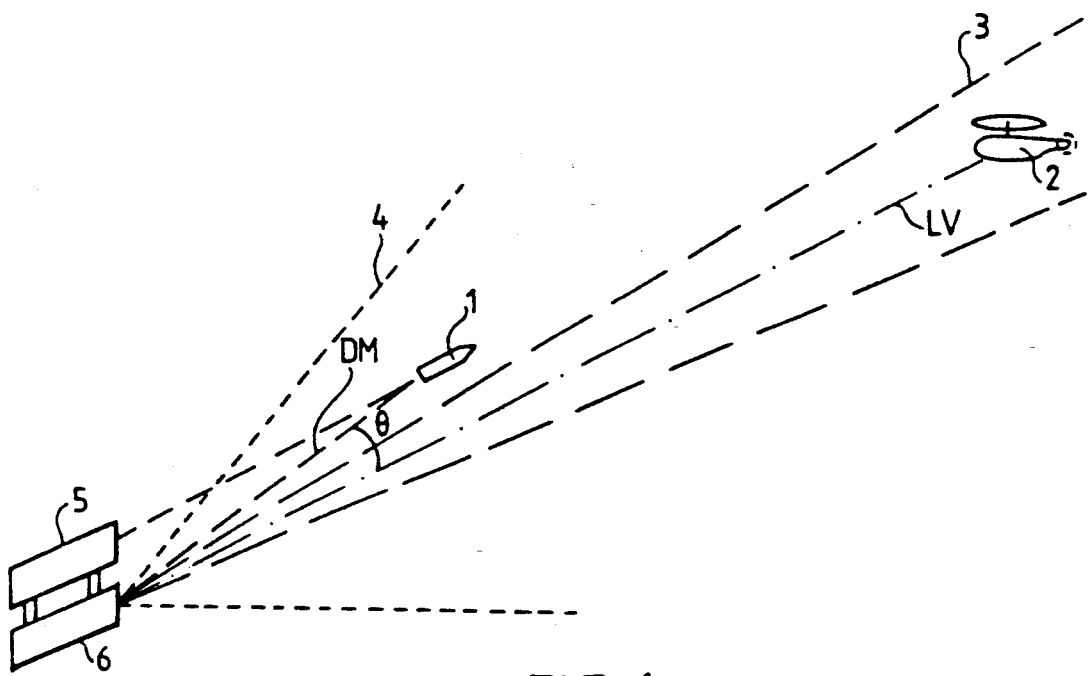
FIG. 1 illustrates the use of a missile-homing device in association with a target-tracking device.

FIG. 1 shows a missile 1 fired by a launch ramp 5 towards a target 2. This target is being tracked by a target-tracking device located in a firing station 6 which is fixedly joined to the launch ramp 5. The launch ramp guides the missile in a direction parallel to the line of sight LV of the target-tracking device, but random causes prompt a certain angular deviation $\theta$ between the direction DM, in which the missile is located, and the line of sight LV. The target-tracking device covers a field 3 that is very narrow. As a consequence, there is a risk that the missile 1 may never penetrate this field and that it will remain invisible to the target tracking device. There is therefore provision for a missile-homing device having the same line of sight LV and covering a field 4 with a far greater aperture than that of the field 3, so that the missile 1 will definitely penetrate this field 4. After the missile has penetrated the field 4, the homing device determines coordinates of the missile, then a standard device, working by remote control or by directive beam, brings the missile back to the line of sight LV.

Figure 2:
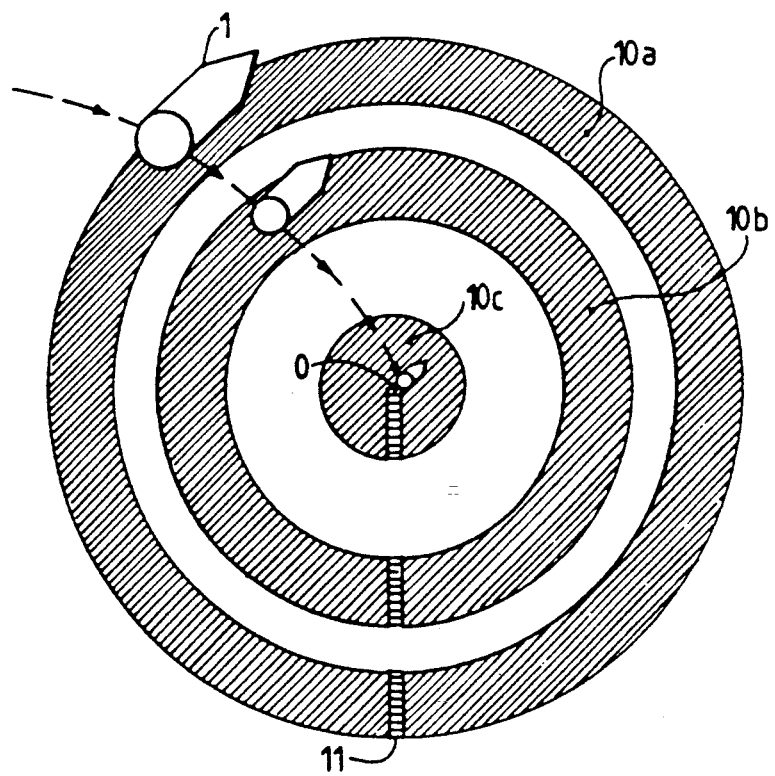
FIG. 2 gives a schematic view of the field scanned by the homing device according to the invention, at three successive instants.

FIG. 2 gives a schematic view of the field scanned by the homing device according to the invention. The intersection of the field with a plane perpendicular to the line of sight LV is shown in hatched form, at three successive instants. It is assumed that the intersection plane is located at a fixed distance from the firing station. At the first instant, located at the start of the flight of the missile 1, the section of the field has the shape of a ring 10a into which the missile 1 penetrates, when it penetrates the cone forming the external envelope of the field 4. The line of sight goes through the center o of the ring 10a. The width of the ring corresponds to the length of a photosensitive sensor 11 which is included in the homing device and shall be described further below.

At a second instant, the section of the field is a ring 10b having the same width but a smaller diameter so that the missile 1 remains in the field as and when it approaches the line of sight LV. Outside the ring 10a or 10b, the homing device is totally insensitive to the presence of the sun and of decoys, notably in the central zone of the ring. At a third stage, during the final stage of its propulsion, the missile has come close enough to the line of sight for the section of the field to have the shape of a disk 10c as the insensitive central zone disappears. The diameter of the section of the field then keeps a constant value. The field of the homing device is then scanned uniformly, without any blind zone at the center, but its dimension is far smaller than the one got with standard fixed-field homing devices. Consequently, its range is considerably increased and there is little likelihood of the sun or of decoys being in a field with as restricted an aperture as this.

Figure 3:
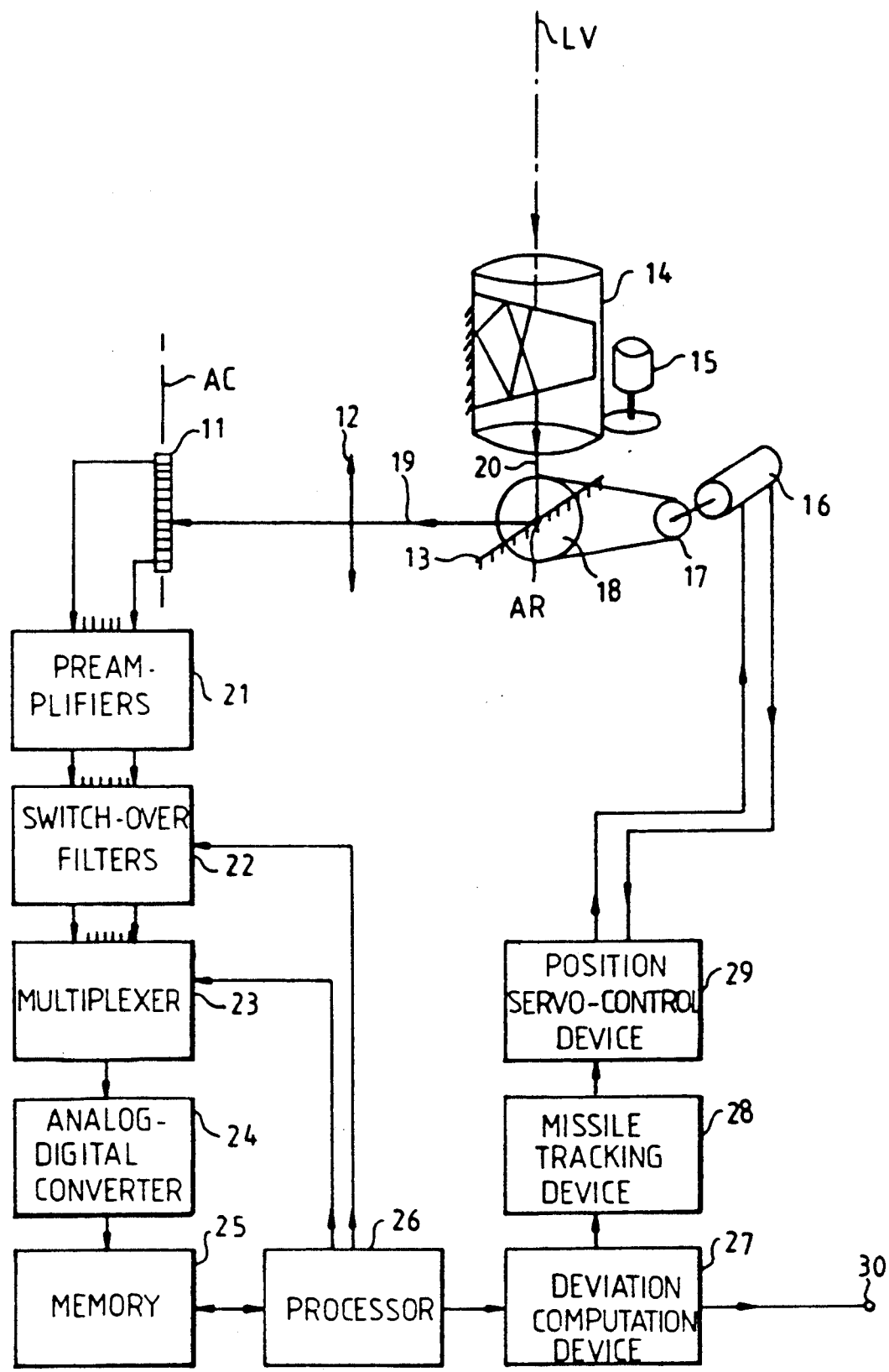
FIG. 3 shows a variant of a part of this exemplary embodiment.

FIG. 3 shows the block diagram of an exemplary embodiment of the homing device according to the invention. It is designed to be associated mechanically with a target-tracking device so as to have a line of sight LV that is parallel and practically merged with that of the target-tracking device. This exemplary embodiment includes means to project and shift an image so as to analyze it by means of a sensor 11. The image of the field is scanned circularly by the sensor 11 which is formed by an alignment of photosensitive cells, the large axis AC of which goes through the center of the image. The image has the shape of a ring centered on the line of sight LV. The presence and the position of the missile are therefore detected by the passage of the image of the missile on at least one of the cells of the sensor 11. These means for projecting and shifting the image essentially comprise: an objective 12, a movable mirror 13, and a rotating prism, called a Taylor prism 14.

The objective 12 is placed between the sensor 11 and the mirror 13. It forms an image on the sensor 11. The mirror 13 is a plane mirror, movable in rotation around an axis AR that goes through the plane of the mirror and is perpendicular both to the optical axis of the objective 12 and to the large axis AC of the alignment of cells forming the sensor 11. The mirror 13 is moved in rotation by a position servo-controlling device comprising a motor associated with an angular position sensor 16, and including a system of transmission by two pulleys 17 and 18 connected by a belt.

The axis of rotation and the optical axis of the rotating prism 14 are merged with the line of sight LV of the homing device. This line of sight LV is parallel to the axis AC and orthogonal to the optical axis of the objective 12. The optical axis of the rotating prism 14 and the optical axis of the objective 12 meet each other on the axis of rotation AR of the mirror. The rotating prism 14 has a constant speed of rotation and it is moved by a motor 15.

A light ray 20 picked up in the field of the homing device is deflected by the mirror 13 in a plane containing the line of sight LV and containing the large axis AC of the sensor 11. The angular position of the mirror 13 determines the aperture of the homing field, namely the diameter of its section. The rotating prism 14 prompts the rotation of the beam 20 around an axis of rotation merged with the line of sight LV. The rotational motion of the prism 14, for a given position of the mirror 13, causes an image to move circularly across the sensor 11. This sensor 11 therefore analyzes a ring of this image, the diameter of which is determined by the angular position of the mirror 13 The sensor 11 simultaneously analyzes 12 pixels located on a radius of the image. The angular position of the mirror 13 varies in the course of time as a function of the angular deviation between the line of sight LV and the direction DM in which the missile is located at the instant considered. This direction DM is known by determining the position of the missile in the image analyzed by the sensor 11.

This exemplary embodiment further includes twelve preamplifiers 21 having inputs respectively connected to the twelve photosnnsitive cells of the sensor 11, and having twelve outputs respectively connected to inputs of twelve switch-over filters 22. The characteristics of these filters are modified, during the flight of the missile, so that they have a wide pass-band at the start of the flight, when the missile is easily visible but shifts rapidly from one pixel to another, and so that they have a restricted pass-band during the flight, and especially at the end of the flight, when the sensitivity of the homing device has to be increased by getting rid of the noise produced by the sensor 11. During the end of the flight, the wide pass-band is no longer needed because the missile image shifts slowly from one pixel to another.

An output of each of the twelve filters 22 is respectively connected to an input of a multiplexer 23 with twelve inputs and one output. This output is connected to the input of an analog/digital converter 24. The multiplexer 23 is activated to make a sequential selection of the signals corresponding to the twelve photosensitive cells of the sensor 11. The converter 24 has an output connected to a data input of a memory 25, in which there are stored the values of the twelve signals given by the twelve photosensitive cells. A processor 26 is connected by buses to the memory 25 to control the reading and writing of the values of these signals. The processor 26 also possesses control outputs connected respectively to control inputs of the switch-over filters 22 to control their pass-band during the flight of the missile, and it possesses one output connected to a control input of the multiplexer 23 to select samples of each of the signals given by the twelve photosensitive cells, after amplification by the preamplifiers 21 and filtering by the filters 22.

The processor 26 has an output connected to an input of a device 27 for computing the deviation between the line of sight LV and the direction DM in which the missile is located. The processor 26 gives the position of the missile as it is detected in the analyzed image. The device 27, which is a standard deviation measurement device, makes a deduction, therefrom, of the coordinates to be given to a remote control device or to a device emitting a directive beam, with the aim of bringing the missile back into the direction of the line of sight. The computing device 27 has an output connected to an output terminal 30 to give two coordinates expressing this deviation. It also has an output connected to an input of a missile-tracking device 28 which is a standard device memorizing the speed of the missile to predict the progress of its trajectory.

The device 28 has an output connected to an input of a position servo-controlling device 29 to give it an instructed value expressing the angular deviation between the line of sight and the direction in which the missile is located, with a certain degree of anticipation. The device 29 has an output connected to the servo-control motor 16 and an input connected to the position sensor associated with the motor 16. The device 29 controls the motor 16 so that it takes the position corresponding to the instructed value. The transmission by the pulleys 17 and 18 and their belt greatly increases the precision with which the position of the mirror is servo-controlled.

The device 29 is a standard position servo-controlling device. The programming of the microprocessor 26 to fulfil the above-described functions is within the scope of those skilled in the art.

If the enveloping cone of the field has an angular semi-aperture of 5°, and if the width of the ring corresponds to an angular aperture of 1°, it is shown that the solid angle of the field is reduced in a ratio equal to 3 with respect to a field having a square section with a width corresponding to an angular aperture of 10°. And this reduction reaches a ratio of 30 when the missile is brought back to the line of sight. The number of photosensitive cells can thus be reduced as compared with a standard device, or else the performance characteristics can be improved if the number of cells is kept. The electronic processing operations, notably to get rid of false alarms, are also, for their part, considerably simplified. It must be noted that the scanning mode used comprises no idle time. Consequently, the scanning has an efficiency of 100% for the analysis of the image. Finally, the probability of the presence of the sun or of a decoy in the analyzed field is reduced in the same proportion.

Should the sun be present in the field before the launching of the missile, it is possible, in certain cases, to modify the position of the plane mirror 13 by a small angle so as to take the sun out of the field, without preventing the acquisition of the missile by the homing device. However, in certain applications, notably for use on board a vessel, the reflections of the sunlight may prove to be very numerous and may cause false alarms. An improvement in the device according to the invention enables this problem to be overcome.

Figure 4:
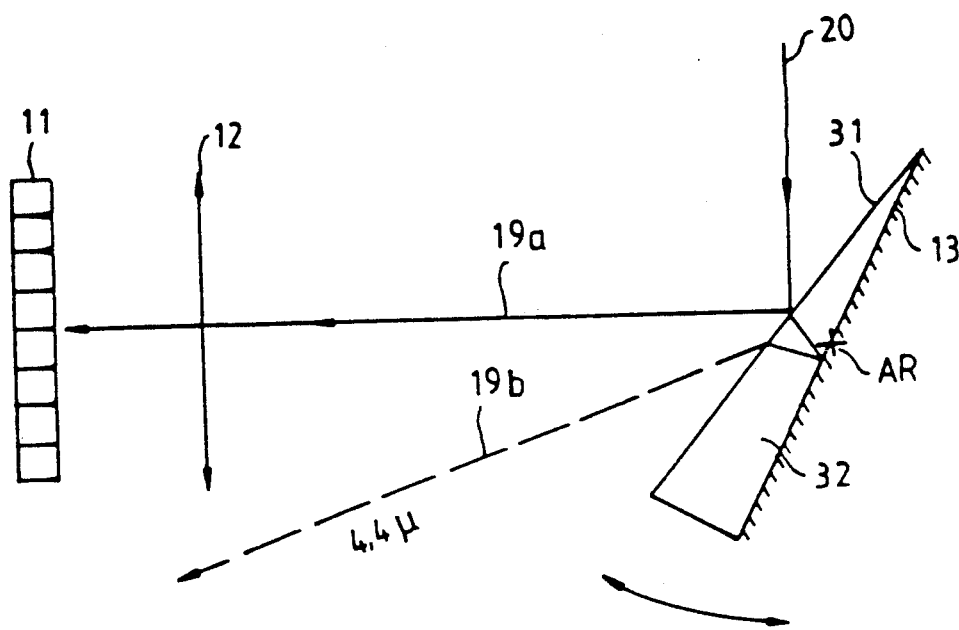

FIG. 4 represents an alternative embodiment of the mirror 13, including a transparent prism 32 that bears, on a first face, a dichroic layer 31 that does a narrow filtering. A second face of the prism 32 is bonded to the surface of the mirror 13. The dirchroic surface 31 reflects all the light except a very narrow band close to the 4.4 micron wavelength, in the case of a homing device that works in the 3 to 5 micron band. An incident light ray 20 is deflected as a ray 19a and a ray 19b, making two different angles with the incident ray 20. The ray 19a, which is reflected by the dichroic surface 31, comprises almost all the wavelengths while the ray 19b comprises only the 4.4 micron wavelength for it has crossed the dirchroic surface 31, got reflected on the metallized surface of the mirror 13 and then re-crossed the dichroic surface 31.

It has to be noted that the ray 19b crosses the dichroic surface 31 twice. This doubles the efficiency of the filtering by this dichroic surface 31 and thus makes it simpler to achieve.

The angle of the prism 32 determines the angular deviation between the rays 19a and 19b. When there is no sun, the position of the mirror 13 is controlled to deflect the rays reflected by the dichroic surface 31, such as the ray 19a, towards the objective 12, and to deflect the rays such as the ray 19b outside the objective 12. The energy loss is low owing to the fact that the band of wavelengths that crosses the dichroic surface 31 is narrow.

There is provision for an output of the processor 26 connected to an additional input of the position servo-control device 29, to give it a control signal should the processor 26 detect false alarms due to the presence of the sun or of decoys, in order to control the filtering in the proximity of the 4.4 micron wavelength.

In the presence of the sun or of decoys, namely when false alarms are detected by the processor 26, the position servo-control device 29 is activated by the processor 26, by means of the devices 27 and 28, to offset the mirror 13 by a pre-determined angle equal to the angle of the prism 32. The dichroic surface 31 takes the place of the surface of the mirror 13, so as to deflect the ray 19b towards the objective 12 and so as to deflect the ray 19a outside the objective 12. As the analyzed image has only wavelengths in the proximity of 4.4 microns, it has little energy loss due to the sun or to decoys.

What is claimed is:

1. A missile homing device to determine coordinates expressing the angular deviation between the direction in which a missile is located and a line of sight in which a target is located, comprising:
   means for analyzing an infrared image,
   means to determine coordinates expressing the angular deviation, on the basis of signals being by the means for analyzing,
   wherein the means for analyzing an image covers a field, the section of which, in a plane perpendicular to the line of sight, is a ring having a diameter that is variable as a function of the angular deviation between the direction in which the missile is located and the line of sight.

2. A device according to claim 1, wherein the means for analyzing comprises:
   a sensor formed by at least one alignment of photosensitive cells;
   means for deflecting a beam of light picked up by the homing device, in a plane going through the line of sight and passing by the large axis of the alignment of cells; and
   means for rotating the beam of light, picked up by the homing device, around an axis of rotation merged with the line of sight.

3. A device according to claim 2, wherein the means for deflecting a beam of light in a plane comprises:

a mirror, movable around an axis perpendicular to the large axis of the alignment of cells and perpendicular to the line of sight; and a position servo-control system servo-controlling the position of the mirror around its axis of rotation as a function of the coordinates expressing the angular deviation between the direction in which the missile is located and the line of sight to servo-control the diameter of the ring on the angular deviation, the missile bieng thus kept in the field covered by the means for analyzing an image.

4. A device according to claim 3, wherein the mirror is a plane mirror and wherein the device further comprises:

a transparent prism bearing a plane dichroic surface passing a narrow band of wavelengths in the proximity of 4.4 microns, said prism being fixed to the surface of the mirror by its face opposite the face bearing the dichroic surface; and control means for controlling the position servo-control device to shift the position of the mirro by a fixed angle so as to put the dichroic surface in the place of the surface of the mirror should the sun or a decoy be present in the field covered by the means for analyzing.

* * * * *